United States Patent
Feng et al.

(10) Patent No.: US 11,256,400 B2
(45) Date of Patent: Feb. 22, 2022

(54) TERMINAL, SPLIT-SCREEN DISPLAY METHOD FOR SCREEN THEREOF, AND STORAGE DEVICE

(71) Applicant: JRD COMMUNICATION (SHENZHEN) LTD, Shenzhen (CN)

(72) Inventors: Dezheng Feng, Shenzhen (CN); Tao Li, Shenzhen (CN); Jiancai He, Shenzhen (CN)

(73) Assignee: JRD COMMUNICATION (SHENZHEN) LTD, Shenzhen (CN)

( * ) Notice: Subject to any disclaimer, the term of this patent is extended or adjusted under 35 U.S.C. 154(b) by 25 days.

(21) Appl. No.: 16/477,875

(22) PCT Filed: Mar. 19, 2018

(86) PCT No.: PCT/CN2018/079465
§ 371 (c)(1),
(2) Date: Jul. 13, 2019

(87) PCT Pub. No.: WO2018/177149
PCT Pub. Date: Oct. 4, 2018

(65) Prior Publication Data
US 2020/0125243 A1    Apr. 23, 2020

(30) Foreign Application Priority Data

Mar. 31, 2017 (CN) .......................... 201710208278.1

(51) Int. Cl.
*G06F 3/0485* (2013.01)
*G06F 9/451* (2018.01)
(Continued)

(52) U.S. Cl.
CPC ........ *G06F 3/04845* (2013.01); *G06F 3/1407* (2013.01); *G06F 9/451* (2018.02); *G06F 2203/04803* (2013.01)

(58) Field of Classification Search
None
See application file for complete search history.

(56) References Cited

U.S. PATENT DOCUMENTS 6,134,708 A * 10/2000 Yui ........................... G06F 8/44
                                                    717/143
6,389,447 B1 * 5/2002 Singh ..................... G06F 9/4881
                                                    718/100
(Continued)

FOREIGN PATENT DOCUMENTS

CN    104598100 A    5/2015
CN    106201167 A    12/2016
(Continued)

OTHER PUBLICATIONS

"Tasks and the Back Stack", Ian Lake, May 12, 2016, 5 pages (Year: 2016).*

(Continued)

*Primary Examiner* — Adam M Queler
*Assistant Examiner* — Haimei Jiang

(57) ABSTRACT

The present disclosure provides a terminal, a split-screen display method for a screen thereof, and a storage device. The method comprises: a terminal system establishing a virtual stack according to an original stack, wherein an active component of the virtual stack is entirely or partially identical to an active component of the original stack; a first area of a terminal screen displaying a user interface corresponding to an active component at the stack top of the original stack, and a second area of the terminal screen displaying a user interface corresponding to an active component at the stack top of the virtual stack.

20 Claims, 2 Drawing Sheets

(51) Int. Cl.
  *G06F 3/14*       (2006.01)
  *G09G 5/14*       (2006.01)
  *G06F 3/0481*     (2013.01)
  *G06F 3/0483*     (2013.01)
  *G06F 3/0486*     (2013.01)
  *G06F 3/04845*    (2022.01)

(56) References Cited

U.S. PATENT DOCUMENTS

| | | | | |
|---|---|---|---|---|
| 2010/0251242 A1* | 9/2010 | Sivasubramanian | .. | G06Q 10/06 718/100 |
| 2011/0138314 A1* | 6/2011 | Mir | ......... | G06F 9/452 715/779 |
| 2012/0081398 A1* | 4/2012 | Sirpal | ................ | G06F 3/0486 345/649 |
| 2012/0084714 A1* | 4/2012 | Sirpal | ................ | G06F 1/1647 715/790 |
| 2013/0111371 A1* | 5/2013 | Reeves | ................ | G06F 3/0486 715/761 |
| 2014/0075394 A1* | 3/2014 | Nawle | ................ | G06F 3/017 715/863 |
| 2016/0127588 A1* | 5/2016 | Hayakawa | ......... | H04N 1/00641 358/498 |
| 2020/0125243 A1* | 4/2020 | Feng | ................ | G06F 3/04845 |

FOREIGN PATENT DOCUMENTS

| | | |
|---|---|---|
| CN | 106201241 A | 12/2016 |
| CN | 106210307 A | 12/2016 |
| CN | 107168664 A | 9/2017 |
| WO | WO2016150325 A1 | 9/2016 |

OTHER PUBLICATIONS

Chinese Office Action for Related Chinese Application No. 201710208278.1 action dated Sep. 29, 2019 (10 Pages).
International Search Report of PCT/CN2018/079465.

\* cited by examiner

TERMINAL, SPLIT-SCREEN DISPLAY METHOD FOR SCREEN THEREOF, AND STORAGE DEVICE

CROSS-REFERENCE TO RELATED APPLICATIONS

The present application is a 35 U.S.C. § 371 National Phase conversion of International (PCT) Patent Application No. PCT/CN2018/079465 filed Mar. 19, 2018, which claims foreign priority of Chinese Patent Application No. 201710208278.1, filed on Mar. 31, 2017 in the State Intellectual Property Office of China, the contents of all of which are hereby incorporated by reference.

TECHNICAL FIELD

The present disclosure relates to the field of terminal display technologies, and in particular, to a terminal, a split-screen display method for a screen thereof, and a storage device.

BACKGROUND

As screens of smart terminals are getting larger and larger, functions of hardware, such as a CPU (Central Processing Unit), a memory, a GPU (Graphics Processing Unit), and the like are becoming more and more powerful, and the requirements of users for one application (APP) being displayed in multiple interfaces at the same time are also becoming higher and higher. At present, if a terminal, while running one task of an application, wants to run another task for a user to operate, the terminal needs to close the currently running task interface, and then can switch to another task interface. For example, when users browse Wechat friend circles, if they need to chat with Wechat friends, they must close the friend circle interfaces and before they switch to chat interfaces. Presently, multiple task interfaces of the same application cannot be displayed at the same time. If a user needs to operate a plurality of tasks of the same application, the user needs to switch back and forth between various task interfaces, which is inconvenient to the user.

SUMMARY

In view of this, the present disclosure provides a terminal, a split-screen display method of a screen thereof, and a storage device, which can display multiple task interfaces of the same application at the same time, so as to facilitate users' operations.

A split-screen display method of a terminal screen of one embodiment of the present disclosure comprises the following operations.

A screen display area is set to comprise a first area and a second area.

A terminal receives instruction for starting an application, and calls an original stack established by a terminal system for the application according to the instruction. The original stack comprises at least one active component.

The terminal system establishes a virtual stack according to the original stack, wherein active components of the virtual stack are entirely or partially identical to active components of the original stack.

The first area displays a user interface corresponding to an active component at the stack top of the original stack, and a second area displays a user interface corresponding to an active component at the stack top of the virtual stack.

A terminal of one embodiment of the present disclosure comprises a processor, a screen, and a transceiver, wherein the screen and the transceiver are connected with the processor.

The processor is configured to set a screen display area to comprise a first area and a second area.

The transceiver is configured to receive instruction for starting an application of the terminal.

The processor is further configured to call an original stack established by a terminal system for the application according to the instruction. The original stack comprises at least one active component.

The processor is further configured to establish a virtual stack according to the original stack, wherein active components of the virtual stack are entirely or partially identical to active components of the original stack.

The screen is configured to display a user interface corresponding to an active component at the stack top of the original stack in the first area, and display a user interface corresponding to an active component at the stack top of the virtual stack in the second area.

A storage device of one embodiment of the present disclosure stores program data, and the program data can be executed to implement the following method.

A screen display area is set to comprise a first area and a second area.

Instruction for starting an application is received, and an original stack established by a terminal system in which the storage device is used for the application is called according to the instruction. The original stack comprises at least one active component.

A virtual stack is established according to the original stack, wherein active components of the virtual stack are entirely or partially identical to active components of the original stack.

The first area displays a user interface corresponding to an active component at the stack top of the original stack, and a second area displays a user interface corresponding to an active component at the stack top of the virtual stack.

The present disclosure establishes a virtual stack according to an original stack, which is equivalent to adding a new stack. An active component of the newly added virtual stack is entirely or partially identical to an active component of the original stack, such that two tasks of the same application can be loaded and run in two display areas; and then user interfaces corresponding to the active components at the stack top of the original stack and at the stack top of the virtual stack are respectively displayed by the two areas, such that a user can operate a plurality of tasks of the same application, avoid switching back and forth between various task interfaces, and facilitate the user's operation.

DETAILED DESCRIPTION

Technical solutions of various exemplary embodiments provided by the present disclosure will be clearly and completely described below in accompany with drawings in the embodiments of the present disclosure. On the premise of no conflict, various embodiments described below and features of the embodiments can be combined with each other.

Figure 1:
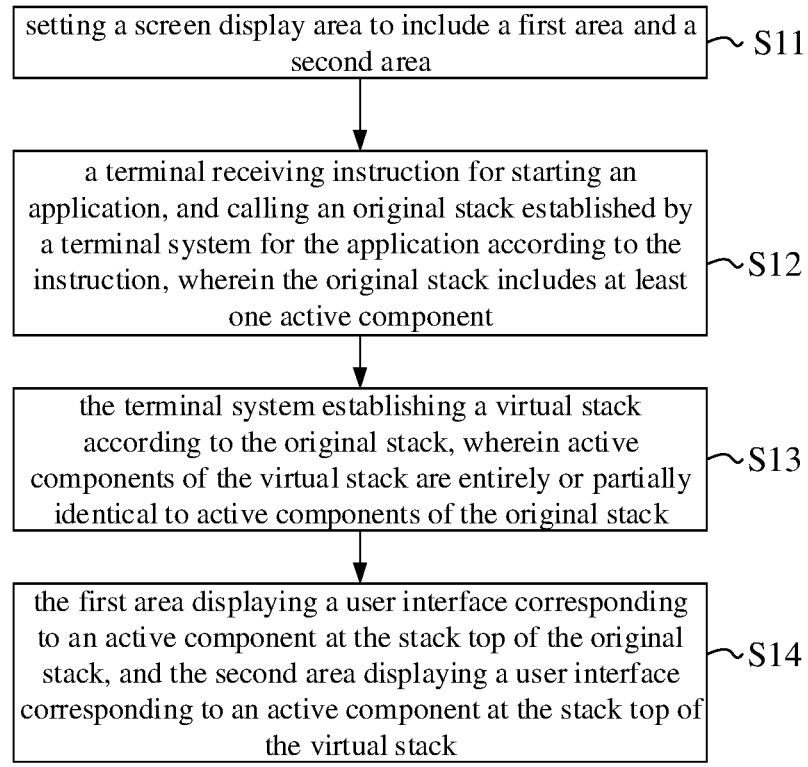
FIG. 1 is a schematic flow chart of a split-screen display method for a terminal screen of an embodiment of the present disclosure.

Referring to FIG. 1, which is a split-screen display method for a terminal screen of one embodiment of the present disclosure. The split-screen display method for a terminal screen can comprises operations S11-S14.

S11: a screen display area is set to comprise a first area and a second area.

This operation can be regarded as implementing screen-split for the terminal screen, wherein the screen can be an integrated touch display screen at the front of a terminal. Before an application starts, locations and sizes of the first area and of the second area on the screen need to be determined firstly. Taking left-right split screen as an example, the first area can be set on a left half of a screen, and the second area can be set on a right half of a screen. Taking up-down split screen as an example, the first area can be set on an upper half of a screen, and the second area can be set on a lower half of a screen. Each of the first area and the second area independently has a display function and a touch control function of a screen, and between the two areas, a boundary can be displayed and can also be not displayed.

In this embodiment, the method for implementing split-screen comprises, but is not limited to, the following two methods.

One, a terminal receives split-screen selection instruction input by a user, and sets a first area and a second area on a screen according to the split-screen instruction. For example, a terminal screen displays a split-screen selection button, a user can select split-screen by means of clicking, dragging, etc., and a terminal system determines positions and sizes of the first area and of the second area according to the user's selection.

Two, a configuration list is stored in a terminal system in advance; corresponding relations between applications and split-screen information are recorded in the configuration list. It can be understood that a split screen pattern corresponding to a certain application is recorded in the configuration list. Before the certain application starts, the terminal system directly inquires the configuration list to determine positions and sizes of the first area and of the second area.

The terminal system can record positions and sizes of the two areas on the screen by performing coordinate identification for the screen. For example, in combination with that shown in FIG. 2, a plane rectangular coordinate system is established by taking one vertex of the screen as the coordinate origin and taking two perpendicular sides of the screen as the abscissa axis and the ordinate axis; if the screen is arranged to be left and right areas 11, 12, according to lengths of two sides and an area ratio of the two areas, coordination ranges of the two areas 11, 12 can be obtained.

S12: the terminal receives instruction for starting an application, and calls an original stack established by a terminal system for the application according to the instruction. The original stack comprises at least one active component.

S13: the terminal system establishes a virtual stack according to the original stack, wherein active components of the virtual stack are entirely or partially identical to active components of the original stack.

Taking an Android system as an example, one application comprises a plurality of tasks, one task comprises a plurality of active components, one active component displays one user interface (UI) correspondingly on a terminal screen, and the terminal system can continuously start many active components to perform display of many user interfaces. Started active components are all stored in stacks. All active components of the same task are all allocated in the same stack. An active component at the stack top of the stack is an active component which is currently running and being displayed. Each active component is executed according to the principle of first-in last-out, for example, when an active component is newly started, the new active component will be compressed into a top of a stack, and it becomes an active component which is currently running and being displayed, and an active component which is previously at the stack top is executed only after the new active component is executed.

This embodiment improves the processing mechanism of framework layers of existing Android systems, and establishes additional stacks. If an intrinsic stack of an application is regarded as an original stack, the additionally established stack in this embodiment is regarded as a virtual stack. Taking the left-right split-screen shown in FIG. 2 as an example, after an application is loaded into the first area 21, all active components of the application are stored in an original stack, and in this embodiment, active components of some tasks or all tasks of the original stack are copied into a virtual stack. Active components of the virtual stack are also executed according to the principle of first-in last-out.

In one embodiment of the present disclosure, arrangement orders of active components from a stack top to a stack bottom in a virtual stack and in an original stack are different. In other words, an execution order of various tasks in a virtual stack can be different from an execution order of various tasks in an original stack.

S14: the first area displays a user interface corresponding to an active component at the stack top of the original stack, and a second area displays a user interface corresponding to an active component at the stack top of the virtual stack.

Figure 2:
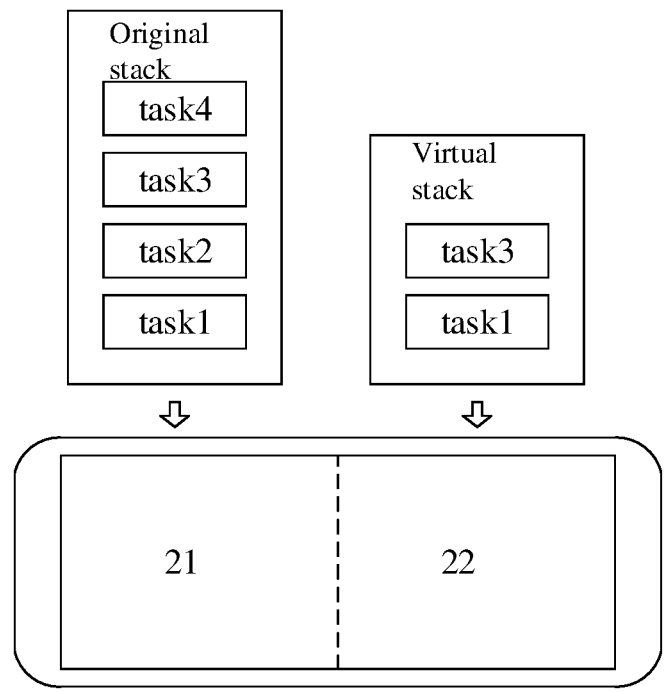
FIG. 2 is a schematic view of implementing split-screen display for the terminal screen based on the method shown in FIG. 1.

Also referring to FIG. 2, taking an original stack including tasks task1, task2, task3, and task4, which are arranged along a direction from a stack bottom to a stack top, as an example, the first area 21 displays a user interface corresponding to an active component of the task task4, wherein this active component is located at the stack top of the original stack. For the same reason, the virtual stack comprises the task task1 and task 3 arranged along the direction from the stack bottom to the stack top, and the second area 22 displays a user interface corresponding to an active component of the task task3 which is located at the stack top.

If there is no task for a user to execute in the current virtual stack, the user can send instruction for calling all tasks that can be established in the application by clicking operations, the terminal system resolves an application configuration document (AndroidManifest.xml), calls all tasks that can be established in the application, and can display the tasks in the form of a list in the second area 22 for the user to select. After the user selects, the selected task is added into the virtual stack.

As can be known from the above, in this embodiment, by adding a new stack, the virtual stack, the same application is enabled to be loaded and run in two display areas of one screen. In this way, a user can operate user interfaces of tasks in various display areas, that is, implement operation for user interfaces of a plurality of tasks of the same application, avoid switching back and forth between a plurality of task interfaces, and facilitate the user's operation. In other words, this embodiment implements separated management of a plurality of split screens in a Android system framework layer, such that a plurality of split screens run a plurality of tasks of the same application respectively, and they do not affect each other, thereby finally realizing display and operation for a single application with multiple tasks.

For example, after a terminal starts the application "Wechat", the task "friend circle" can be run in a first area, and the first area displays all user interfaces generated when operating the friend circle; the task "chat" is run in a second area, and the second area displays all user interfaces generated when chatting. When the user browses the Wechat friend circle in the first area, he/she can chat with Wechat friends in the second area, and does not need to perform switching between a friend circle interface and a chatting interface on a screen. The operation is simple.

The present disclosure can further dynamically adjust split-screen display during a multi-task split-screen display process of an application. Specifically, a terminal receives split-screen modification instruction of a user, wherein the split-screen modification instruction can be generated by means of clicking, dragging, etc.; afterwards, a terminal system determines positions and sizes of modified first area and second area according to the user's split-screen modification instruction, and modifies window position parameters, or window size parameters, or both window position parameters and window size parameters of stack management according to the split-screen modification instruction; further, re-arranges the first area and the second area according to modified window position parameters, or modified window size parameters, or both modified window position parameters and modified window size parameters, and displays a re-arranged user interface.

Figure 3:
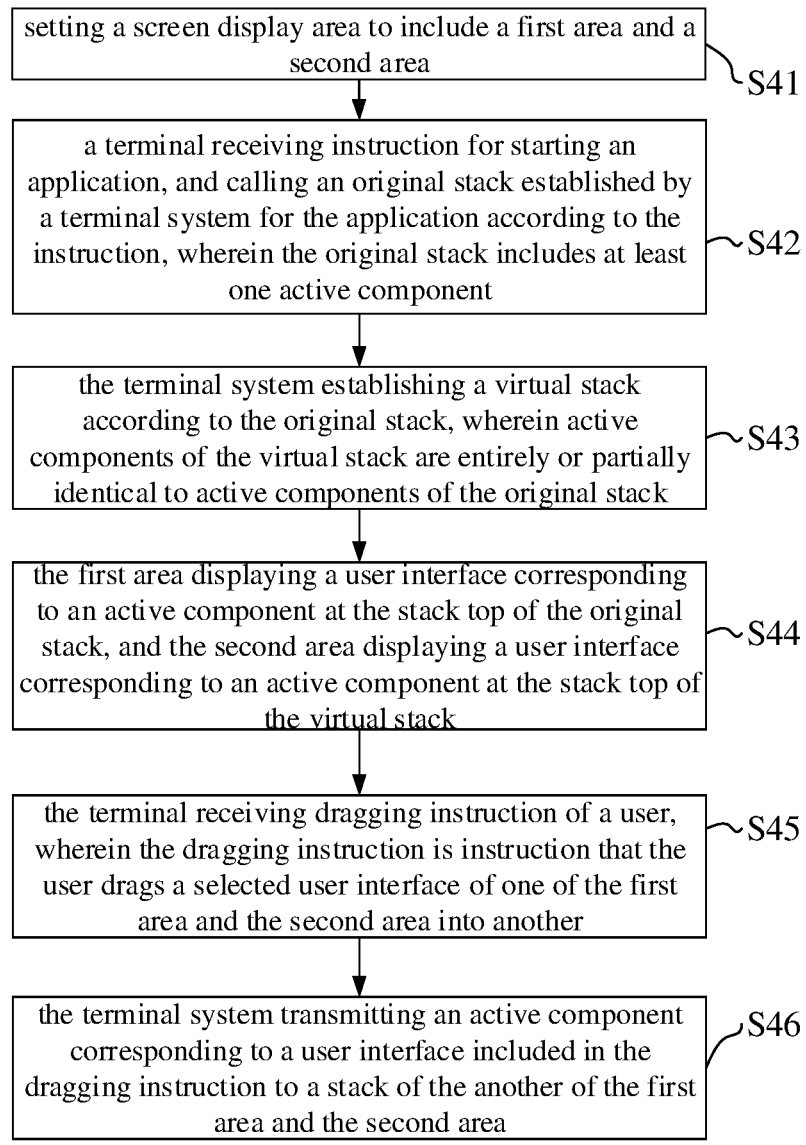
FIG. 3 is a schematic flow chart of a split-screen display method for a terminal screen of another embodiment of the present disclosure.

Although the first area and the second area independently execute different tasks, the two areas can perform data interaction therebetween. Referring to FIG. 3, which is a split-screen display method for a terminal screen of another embodiment of the present disclosure. The split-screen display method for a terminal screen can comprise operations S31-S36.

S31: a screen display area is set to comprise a first area and a second area.

S32: a terminal receives instruction for starting an application, and calls an original stack established by a terminal system for the application according to the instruction. The original stack comprises at least one active component.

S33: the terminal system establishes a virtual stack according to the original stack, wherein active components of the virtual stack are entirely or partially identical to active components of the original stack.

S34: the first area displays a user interface corresponding to an active component at the stack top of the original stack, and a second area displays a user interface corresponding to an active component at the stack top of the virtual stack.

S35: the terminal receives dragging instruction of a user, wherein the dragging instruction is instruction that the user drags a selected user interface of one of the first area and the second area into another.

S36: the terminal system transmits an active component corresponding to a user interface comprised in the dragging instruction to a stack of the another of the first area and the second area.

After two tasks are started in split screens at the same time, for example, in combination with that shown in FIG. 2, in the first area 21, the task task4 is executed, and the user interface 1 corresponding to the active component 1 of the task task4 at the stack top of the original stack is displayed; in the second area 22, the task task3 is executed, and the user interface 2 corresponding to the active component 2 of the task task3 at the stack top of the virtual stack is displayed; the user interface 1 and the user interface 2 can perform real-time data interaction by means of being dragged by a user.

Specifically, a user selects (data of) the user interface 1 and drags it into the user interface 2, and the terminal transmits (selected data of) the active component 1 of the original stack to the virtual stack based on IPC (Inter-Process Communication) technology and through a task management strategy center (Activity Manager Service) of the system. For the same reason, the user can also transmit task data in the second area 22 to a task in the first area 21 by means of dragging. In this embodiment, (data of) the active components of all tasks in the virtual stack and in the original stack can interact through the same data interface.

It should be understood that the various embodiments described above may be combined with each other, and that the above functions may be stored in an electronic device readable storage medium if implemented in the form of a software function and sold or used as a stand-alone product. That is, the present disclosure further provides a storage device storing program data, wherein the program data can be executed to implement the methods of the above embodiments, wherein the storage device can be a USB flash drive, an optical disk, a server, and the like. In other words, various embodiments of the present disclosure may be embodied in the form of a software product, which comprises instruction for enabling a smart terminal to perform all or some of the operations of the methods described in the various embodiments.

Figure 4:
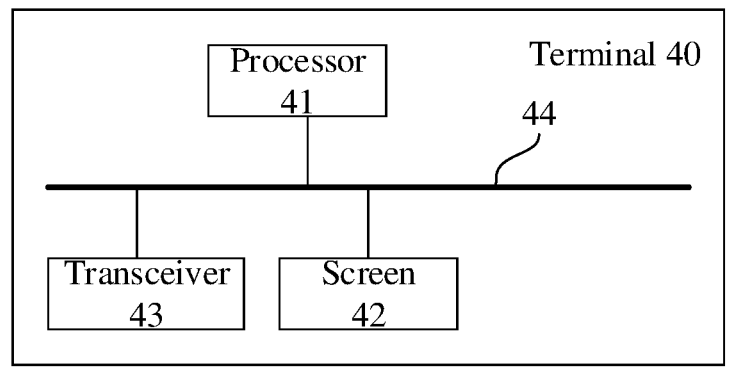
FIG. 4 is a structural schematic view of a terminal of one embodiment of the present disclosure.

Referring to FIG. 4, which is a terminal of one embodiment of the present disclosure. The terminal 40 can comprise a processor 41, a screen 42, a transceiver 43, and a communication bus 44; the screen 42 and the transceiver 43 can be connected with the processor 41 through the communication bus 44.

The processor 41 is configured to set a display area of the screen 42 to comprise a first area and a second area.

The transceiver 43 is configured to receive instruction for starting an application of the terminal 40.

The processor 41 is further configured to call an original stack established by a system of the terminal 40 for the application according to the instruction. The original stack comprises at least one active component.

The processor 41 is further configured to establish a virtual stack according to the original stack, wherein active components of the virtual stack are entirely or partially identical to active components of the original stack.

The screen 42 is configured to display a user interface corresponding to an active component at the stack top of the original stack in the first area, and display a user interface corresponding to an active component at the stack top of the virtual stack in the second area.

During a multi-task split-screen display process of an application, the terminal 40 can further dynamically adjust split-screen display. Specifically, the transceiver 43 is configured to receive split-screen modification instruction of a user, wherein the split-screen modification instruction can be generated by means of clicking, dragging, etc. The processor 41 determines positions and sizes of modified first area and second area according to the user's split-screen modification instruction, and modifies window position parameters, or window size parameters, or both window position parameters and window size parameters of stack management according to the split-screen modification instruction; further, re-arranges the first area and the second area according to modified window position parameters, or modified window size parameters, or both modified window position parameters and modified window size parameters. The screen 42 displays a re-arranged user interface.

Although the first area and the second area independently execute different tasks, the two areas can perform data interaction therebetween. In other words, the transceiver 43 is further configured to receive dragging instruction of a user, wherein the dragging instruction is instruction that the user drags a selected user interface of one of the first area and the second area into another. Afterwards, the processor 41 is configured to transmit an active component corresponding to a user interface comprised in the dragging instruction to a stack of the another of the first area and the second area. All active components in the virtual stack and in the original stack can interact through the same data interface.

The aforementioned structural components of the terminal 40 of this embodiment execute the split-screen display methods for screens of the above embodiments correspondingly, and have the same technical effect as the methods.

The terminal described in the full text of the present disclosure can be a mobile terminal such as a smart phone, a PDA (Personal Digital Assistant), and so on, and can also be a wearable device having a screen display function, which is worn on limbs or embedded in clothing, jewelry, and accessories.

The above descriptions are only embodiments of the present disclosure, and are not intended to limit the patent scope of the present disclosure. All equivalent structures or equivalent flow chart transformations made by the content of the specification and drawings of the present disclosure, for example, mutual combinations of technical features between various embodiments, or direct or indirect uses in other related technical fields, for the same reason, are comprised within the scope of the patent protection of the present disclosure.

What is claimed is:

1. A split-screen display method of a terminal screen, comprising:
   setting a screen display area of the terminal screen to comprise a first area and a second area, wherein the terminal screen is an integrated touch display screen;
   receiving instruction for starting an application, and calling an original stack established for the application according to the instruction, wherein the original stack comprises at least one active component;
   establishing a virtual stack according to the original stack, wherein one or more active components of the virtual stack are identical to one or more active components of the original stack;
   displaying a user interface corresponding to the active component at a stack top of the original stack in the first area and displaying a user interface corresponding to the active component at a stack top of the virtual stack in the second area, using the first area and the second area to run a plurality of tasks of the application respectively without affecting each other, and thereby loading and running the application in both the first area and the second area;
   wherein the first area and the second area are respectively configured to display user interfaces generated by running different tasks of the application.

2. The method according to claim 1, further comprising:
   receiving dragging instruction of a user, wherein the dragging instruction is instruction that the user drags a selected user interface of one of the first area and the second area into another;
   transmitting an active component corresponding to a user interface comprised in the dragging instruction to a stack of the another of the first area and the second area.

3. The method according to claim 2, wherein, all active components in the virtual stack and in the original stack interact through the same data interface.

4. The method according to claim 1, wherein, arrangement orders of active components from a stack top to a stack bottom in a virtual stack and in an original stack are different.

5. The method according to claim 1, further comprising:
   receiving split-screen modification instruction of a user, and modifying window position parameters, or window size parameters, or both window position parameters and window size parameters of stack management according to the split-screen modification instruction;
   re-arranging the first area and the second area according to modified window position parameters, or modified window size parameters, or both modified window position parameters and modified window size parameters, and displaying a re-arranged user interface.

6. The method according to claim 1, wherein, the operation of setting a screen display area of the terminal screen to comprise a first area and a second area comprises:
   receiving split-screen selection instruction input by a user, and setting the first area and the second area on the terminal screen according to the split-screen instruction; or storing a configuration list in advance, wherein corresponding relations between applications and split-screen information are recorded in the configuration list, before an application starts, directly inquiring the configuration list to determine positions and sizes of the first area and of the second area.

7. The method according to claim 1, further comprising:
   if there is no active component fora user to execute in the virtual stack, sending instruction for calling all active components that can be established in the application;
   resolving an application configuration document, calling all active components that can be established in the application, and displaying the active components in the form of a list in the second area for the user to select;
   after the user selects, adding the selected active components into the virtual stack.

8. A terminal comprising a processor, a screen, and a transceiver, wherein the screen is an integrated touch display screen, and the screen and the transceiver are connected with the processor; wherein,
   the processor is configured to set a screen display area of the screen to comprise a first area and a second area;
   the transceiver is configured to receive instruction for starting an application of the terminal;
   the processor is further configured to call an original stack established by a terminal system for the application according to the instruction, wherein the original stack comprises at least one active component;
   the processor is further configured to establish a virtual stack according to the original stack, wherein one or more active components of the virtual stack are identical to one or more active components of the original stack;
   the screen is configured to display a user interface corresponding to the active component at a stack top of the original stack in the first area and display a user interface corresponding to the active component at a stack top of the virtual stack in the second area, use the first area and the second area to run a plurality of tasks of the application respectively without affecting each other, and thereby load and run the application in both the first area and the second area;

wherein the first area and the second area are respectively configured to display user interfaces generated by running different tasks of the application.

9. The terminal according to claim 8, wherein, the transceiver is further configured to receive dragging instruction of a user, wherein the dragging instruction is instruction that the user drags a selected user interface of one of the first area and the second area into another;

the processor is configured to transmit an active component corresponding to a user interface comprised in the dragging instruction to a stack of the another of the first area and the second area.

10. The terminal according to claim 9, wherein, all active components in the virtual stack and in the original stack interact through the same data interface.

11. The terminal according to claim 8, wherein, the transceiver is further configured to receive split-screen modification instruction of a user;

the processor is configured to modify window position parameters, or window size parameters, or both window position parameters and window size parameters of stack management according to the split-screen modification instruction, and, re-arrange the first area and the second area according to modified window position parameters, or modified window size parameters, or both modified window position parameters and modified window size parameters;

the screen is configured to display a re-arranged user interface.

12. The terminal according to claim 8, wherein, the transceiver is configured to receive split-screen selection instruction input by a user, and the processor is configured to set the first area and the second area on the screen according to the split-screen instruction; or the processor is configured to store a configuration list therein in advance, wherein corresponding relations between applications and split-screen information are recorded in the configuration list, before an application starts, the processor is further configured to directly inquire the configuration list to determine positions and sizes of the first area and of the second area.

13. The terminal according to claim 8, wherein, arrangement orders of active components from a stack top to a stack bottom in a virtual stack and in an original stack are different.

14. The terminal according to claim 8, wherein, the first area and the second area independently execute different tasks, and there is data interaction between the first area and the second area.

15. A storage device, wherein, the storage device stores program data, and the program data is executed to implement the following method:

setting a screen display area of a terminal screen to comprise a first area and a second area, wherein the terminal screen is an integrated touch display screen;

receiving instruction for starting an application, and calling an original stack established by a terminal system in which the storage device is used for the application according to the instruction, wherein the original stack comprises at least one active component;

establishing virtual stack according to the original stack, wherein one or more active components of the virtual stack are identical to one or more active components of the original stack;

displaying a user interface corresponding to the active component at a stack top of the original stack in the first area and displaying a user interface corresponding to the active component at a stack top of the virtual stack in the second area, using the first area and the second area to run a plurality of tasks of the application respectively without affecting each other, and thereby loading and running the application in both the first area and the second area;

wherein the first area and the second area are respectively configured to display user interfaces generated by running different tasks of the application.

16. The storage device according to claim 15, wherein, the program data is further executed to implement:

receiving dragging instruction of a user, wherein the dragging instruction is instruction that the use r drags a selected user interface of one of the first area and the second area into another;

transmitting an active component corresponding to a user interface comprised in the dragging instruction to a stack of the another of the first area and the second area.

17. The storage device according to claim 16, wherein, all active components in the virtual stack and in the original stack interact through the same data interface.

18. The storage device according to claim 15, wherein, arrangement orders of active components from a stack top to a stack bottom in a virtual stack and in an original stack are different.

19. The storage device according to claim 15, wherein, the program data is further executed to implement:

receiving split-screen modification instruction of a user, and modifying window position parameters, or window size parameters, or both window position parameters and window size parameters of stack management according to the split-screen modification instruction;

re-arranging the first area and the second area according to modified window position parameters, or modified window size parameters, or both modified window position parameters and modified window size parameters and displaying a re-arranged user interface.

20. The storage device according to claim 15, wherein, in the operation of setting a screen display area of a terminal screen to comprise a first area and a second area, the program data is executed to implement:

receiving split-screen selection instruction input by a user, and setting the first area and the second area on the terminal screen according to the split-screen instruction; or before an application starts, calling a configuration list stored in advance, wherein corresponding relations between applications and split-screen information are recorded in the configuration list, directly inquiring the configuration list to determine positions and sizes of the first area and of the second area.

* * * * *